June 19, 1956
S. E. EDSTRÖM ET AL
2,751,195
INSERT FOR ROCK DRILLS
Filed April 20, 1951
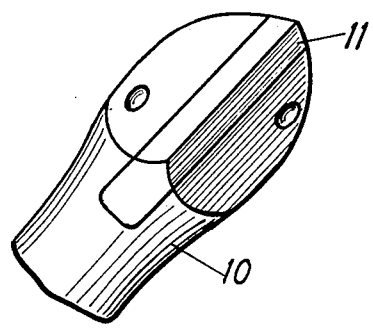
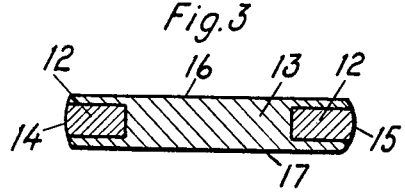
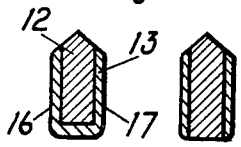
Inventors
Sven Erik Edstrom
Bo Gisner
by Sommers & Young
Attorneys

United States Patent Office 2,751,195
Patented June 19, 1956

2,751,195

INSERT FOR ROCK DRILLS

Sven Erik Edström and Bo Gisner, Johanneshov, Sweden, assignors to Sandvikens Jernverks Aktiebolag, Sandviken, Sweden Application April 20, 1951, Serial No. 221,957

Claims priority, application Sweden April 21, 1950

6 Claims. (Cl. 255—63)

The present invention relates to a new and improved embodiment of hard metal inserts for rock drills. The insert which shall have substantially flat form and consist of parts or zones of different hardness is substantially characterized in that the harder portions are considerably shorter than the length of the insert in respect of the longitudinal direction of the insert and so arranged in less hard material that they nowhere reach the broadsides of the insert.

It is already known to manufacture hard metal inserts having zones of different hardness. The hardest material is usually placed at the ends of the insert at the periphery of the drill bit and/or even in the cutting edge where stresses and wear are most severe. It is further known to provide the inserts with a hard surface while the core is made considerably softer.

While thus in the known inserts the end portions of the inserts are completely made of the harder material this material according to the invention is disposed in relatively small parts of a less hard material and at least near the broad sides of the insert wholly embedded in this material. As compared with the previously known inserts the insert according to the invention involves several substantial advantages some of which will be indicated in the following.

When manufacturing composite inserts of hard metal according to the invention a diffusion in the zone dividing lines is obtained whereby the transition from harder to softer material is more or less continuous. However, tensions between the zones inter alia depending upon different temperature coefficients cannot be obviated and ruptures occur readily in the zone lines and cause rejection. It has been proved in practice that the risk of ruptures completely or almost completely can be eliminated by forming the harder portions considerably shorter than the length of the insert in respect of the longitudinal direction and at the same time carefully embedding them in softer material. These parts may suitably have a more or less rounded form. Further it is very important that the hard zones do not extend to the broad sides of the insert, especially at the ends of the insert. This is due to the fact that it has proved to be very difficult to obtain sufficiently good brazing joints between the harder zones and the rock drill bit. A cause of this may be that the harder hard metal usually contains considerably less bonding metal, such as cobalt, than the softer one. Faulty brazing joints at the insert ends often cause ruptures in the hard metal.

The invention is more clearly disclosed by the accompanying drawing in which Fig. 1 is a perspective view of a rock drill with hard metal inserts and Fig. 2 an elevation of a similar insert. Fig. 3 is a section through the insert shown in Fig. 2, seen along the line 3—3, and Figs. 5, 6, and 7 are sections through some other embodiments. Fig. 4, finally, is a section along the line 4—4, in Fig. 2 through two embodiments of the insert.

The drill bit 10 shown in Fig. 1 has a groove in which a hard metal insert 11 is fastened, preferably by brazing or in any other suitable way. The bit may, of course, be provided with more inserts, for example, 4 inserts arranged so as to form a cross and each insert may be divided into two or more separate parts.

In Fig. 2 one side of the plate-formed insert 11 is shown and in Figs. 3–7 12 designates portions or zones of hard metal of greater hardness while 13 designates zones of tougher and less hard hard metal. Figs. 3 and 5 show embodiments in which the harder portions reach the insert ends 14, 15, while the broadsides 16, 17 of the insert consist exclusively of the tougher and less hard material. According to the embodiment shown in Fig. 6 the harder portions are arranged at the insert ends in the form of cylinders. However, they do not reach as far as to the end surfaces or broadsides. Though, the harder portions or zones need not be cylindrical but may have any other form. The corners may be rounded off in order to reduce tensions caused by different temperature coefficients of the materials used.

Fig. 7 illustrates how a number of hard portions whose cross-sections are more or less oval are arranged centrally after each other along the whole length of the insert so as to form the main portion of the cutting edge. The cross-section may also have other forms, for example, be rectangular, cylindrical, or the like.

The hard parts or zones should be so short that each part in respect of the longitudinal direction of the insert has a length not exceeding 1½ to 2 times the width of the insert. Further, the parts or zones should be separated from each other by intermediate areas of softer material. Hereby the tensions are compensated and the risk of e. g. longitudinal cracks occurring or insert portions being broken off is obviated.

Fig. 4 shows two embodiments in which the harder parts either reach the bottom surface of the insert or end above the bottom surface so that this consists of softer material. The softer layer between the broadside or bottom surface of the insert and the harder material may advantageously have a thickness exceeding 1/20 to 1/10 of the width of the insert.

By softer material is to be understood for example, a hard metal containing a higher percentage of bonding metal, such as cobalt, than the harder material. The difference in respect of hardness may also be effected by suitably choosing carbides and other hard substances or a suitable grain size or the like and by combining these measures.

The invention is not limited to the embodiments shown in the drawing but comprises any rock drill insert within the scope of the accompanying claims. Thus the embodiments according to Figs. 3, 5, and 6 may be combined with that shown in Fig. 7.

Having now described our invention, what we claim as new and desire to secure by Letters Patent is:

1. In a percussion, rock drill bit an insert of hard metal, composed of grains of carbide material and binding metal, said insert having substantially parallel side surfaces and being composed of two portions of hard metal of substantial hardness, and another portion composed of hard metal of less hardness but tougher than the hard metal in the aforementioned portions, said two portions being positioned in the other portion and being integrally united therewith, said two portions also being positioned at the ends of the insert and having three substantially plane inner side surfaces, perpendicular to each other and surrounded by the hard metal of less hardness, said two portions each having an outer side surface with a circular, cylindrical envelope surface, each of said two portions having a length, considerably shorter than the length of the insert in its longitudinal direction.

2. In a percussion, rock drill bit an insert of hard metal, composed of grains of carbide material and binding metal, said insert having substantially parallel side surfaces and being composed of two portions of hard metal of substantial hardness, and another portion composed of hard metal of less hardness but tougher than the hard metal in the aforementioned portions, said two portions being positioned in the other portion and being integrally united therewith, said two portions also being positioned at the ends of the insert and having two substantially plane inner surfaces spaced apart and substantially parallel to said side surfaces, respectively, of said insert and said portions having a third, intermediate surface located between and joining said two surfaces of said portions of substantial hardness, said third surface being surrounded by said hard metal of less hardness.

3. In a percussion, rock drill bit an insert of hard metal, composed of grains of carbide material and binding metal, said insert having substantially parallel side surfaces and containing two portions of hard metal of substantial hardness, and the rest of the insert, being composed of hard metal of less hardness but tougher than the hard metal in the aforementioned portions, said two portions being positioned in the rest of the insert and being integrally united therewith, said portions also being positioned at the ends of the insert and having three inner plane side surfaces, perpendicular to each other and surrounded by the hard metal of less hardness, said portions having an outer side surface with a substantially cylindrical envelope surface, each of said portions having a length, considerably shorter than the length of the insert in its longitudinal direction.

4. In a percussion, rock drill bit an insert of hard metal, composed of grains of carbide material and binding metal, said insert having substantially parallel side surfaces and containing two portions of hard metal of substantial hardness, and the rest of the insert being composed of hard metal of less hardness but tougher than the hard metal in the aforementioned portions, said two portions being positioned in the rest of the insert and being integrally united therewith, said portions being positioned at the ends of the insert and having an outer side surface with a substantially cylindrical envelope surface, said two portions having their other side surfaces formed as a substantially cylindrical envelope surface and entirely surrounded by the hard metal of less hardness, each of said two portions having a length, considerably shorter than the length of the insert in its longitudinal direction the central part of the cutting edge consisting of hard metal of less hardness than said two portions.

5. In a percussion, rock drill bit an insert of hard metal, composed of grains of carbide material and binding metal, said insert having substantially parallel side surfaces, and containing two portions of hard metal of substantial hardness, and the rest of the insert being composed of hard metal of less hardness but tougher than the hard metal in the aforementioned portions, said two portions being positioned in the rest of the insert and being integrally united therewith, said portions being positioned at the ends of the insert and each having an outer side surface with a substantially cylindrical envelope surface, said two portions having their other side surfaces formed as a cylindrical envelope surface, said surfaces together with the bottom surfaces of said two portions being entirely surrounded by the hard metal of less hardness, each of said two portions having a length considerably shorter than the length of the insert in its longitudinal direction the central part of the cutting edge consisting of hard metal of less hardness than said two portions.

6. In a percussion, rock drill bit an insert of hard metal, composed of grains of carbide material and binding metal, said insert having substantially parallel side surfaces, and containing two portions of hard metal of substantial hardness, and the rest of the insert, being composed of hard metal of less hardness but tougher than the hard metal in the aforementioned portions, said two portions being positioned in the rest of the insert and being integrally united therewith, said portions also being positioned at the ends of the insert and having three inner plane side surfaces, perpendicular to each other and surrounded by the hard metal of less hardness, said portions having an outer side surface with a substantially cylindrical envelope surface, each of said portions having a length, considerably shorter than the length of the insert in its longitudinal direction the central part of the cutting edge consisting of hard metal of less hardness than said two portions.

References Cited in the file of this patent

UNITED STATES PATENTS

| | | |
|---|---|---|
| 1,471,526 | Pickin | Oct. 23, 1923 |
| 1,798,229 | Spang | Mar. 31, 1931 |
| 1,855,330 | Zublin | Apr. 26, 1932 |
| 2,101,376 | Voigtlander | Dec. 7, 1937 |
| 2,121,202 | Killgore | June 21, 1938 |
| 2,579,268 | Malherbe | Dec. 18, 1951 |